US006382521B1

(12) United States Patent
Haas

(10) Patent No.: US 6,382,521 B1
(45) Date of Patent: May 7, 2002

(54) SPRAY POWDER-COATING SYSTEM

(75) Inventor: Gerald Haas, St. Gallen (CH)

(73) Assignee: ITW Gema AG, St. Gallen (CH)

( * ) Notice: Subject to any disclaimer, the term of this patent is extended or adjusted under 35 U.S.C. 154(b) by 0 days.

(21) Appl. No.: 09/763,315

(22) PCT Filed: Jun. 9, 1999

(86) PCT No.: PCT/EP99/03964

§ 371 Date: Feb. 22, 2001

§ 102(e) Date: Feb. 22, 2001

(87) PCT Pub. No.: WO00/10725

PCT Pub. Date: Mar. 2, 2000

(30) Foreign Application Priority Data

Aug. 22, 1998 (DE) ........................................ 198 38 279

(51) Int. Cl.[7] ............................ A01G 27/00; B05B 5/00

(52) U.S. Cl. ........................... 239/69; 239/67; 239/407; 239/419; 239/704; 239/706; 239/708; 73/861.04; 118/308

(58) Field of Search .............................. 239/67, 68, 69, 239/704, 706, 708, 690; 73/861.04, 861.03; 118/308, 310, 300

(56) References Cited

U.S. PATENT DOCUMENTS

| | | | | |
|---|---|---|---|---|
| 5,131,350 A | | 7/1992 | Buschor | |
| 5,473,947 A | | 12/1995 | Buquet | |
| 5,741,558 A | * | 4/1998 | Otani et al. | 239/69 |
| 5,776,249 A | * | 7/1998 | Rutz | 118/308 |
| 6,017,394 A | * | 1/2000 | Crum et al. | 239/67 |

FOREIGN PATENT DOCUMENTS

EP 0 636 420 A2 2/1995

* cited by examiner

*Primary Examiner*—Steven J. Ganey
(74) *Attorney, Agent, or Firm*—Lewe Hauptman Gilman & Berner, LLP

(57) ABSTRACT

A spray powder-coating system comprising at least one flow throttle (8, 34) in a compressed-air line of an injector (2). An electronic control unit (50) non-linearly controls the throttle as a function of setpoints.

10 Claims, 2 Drawing Sheets

SPRAY POWDER-COATING SYSTEM

Figure 1:
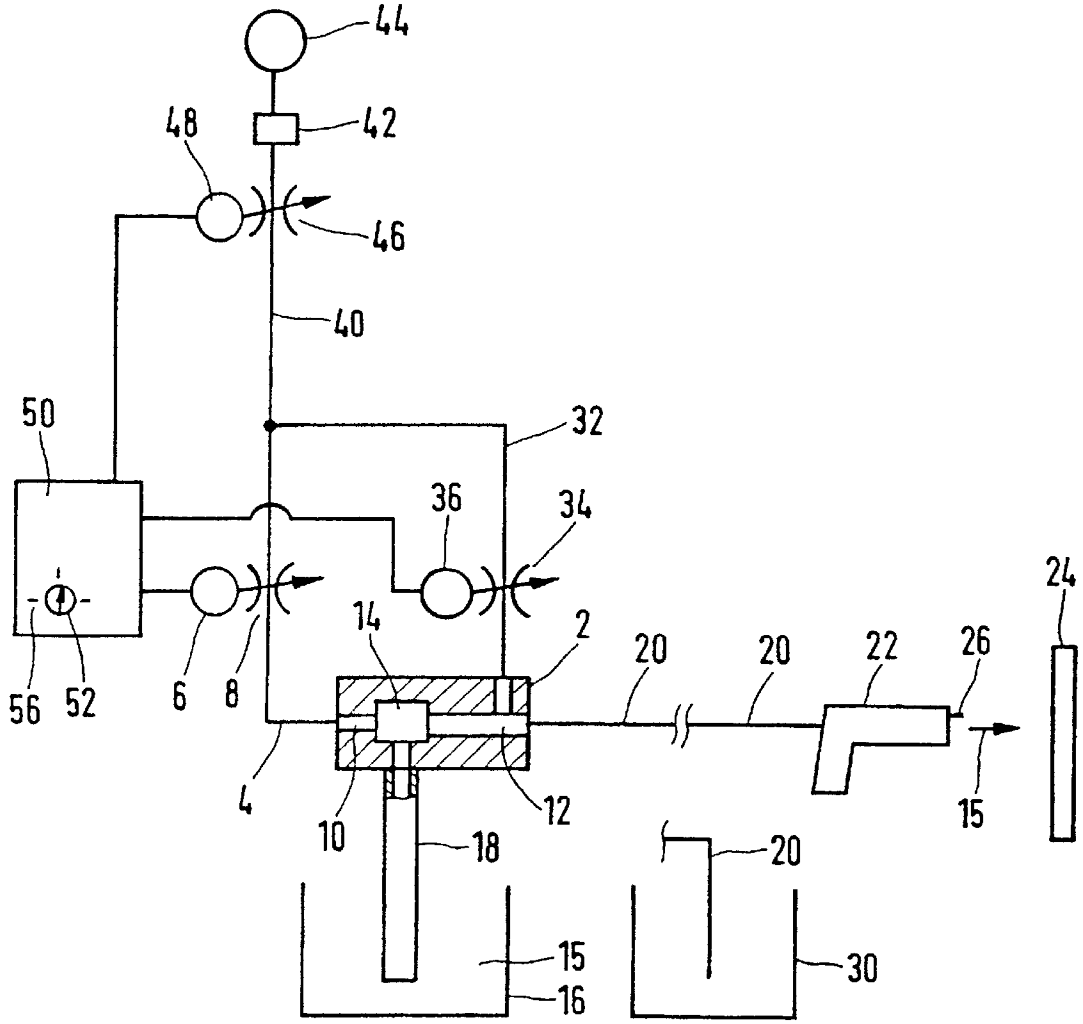

The invention relates to a spray powder-coating system defined in the preamble of claim 1.

Such a spray powder-coating system is known from the European patent document 0 636 420 A3. Therein a pressure regulator is configured both in a pneumatic conveyance line and in an supplemental air line. A computer plots the powder conveyance rates (m) on a first coordinate axis and the air conveyance rates (FV) on a second coordinate axis. Moreover and with respect to at least one given embodiment of the spray powder-coating system, the graph shows a curve of the optimal total air rate (GV) consisting of the conveyance air and any supplemental air. A setpoint (set m) of the setpoint powder feed rates can be set at an input 52 of this computer. Based on this setpoint of powder feed rates, the computer calculates, by means of the curve of total air rates, the associated value FV of the air feed rate. Moreover, based on the differential of total air rate and air feed rate, the computer also computes any required supplemental air rate (set ZV). The setpoint air feed rates (set FV) and any required additional setpoint of supplemental air rate (set ZV) is used by the computer to drive the conveyance-air pressure-regulator and that for the supplemental air. Such a spray powder-coating system however operates fairly accurately only when the actual values of the conveyance air and of the supplemental air are taken into account in said regulation procedure. The regulators keep the air pressure constant in their lines. But this feature leads to a constant rate of conveyed air—in other words a constant quantity of air per unit time—only when the flow impedance remains constant downstream of the particular regulator. If said impedance does change, the rate of conveyance air will also change. The values and curves in said plot are from observation or obtained empirically for a given powder conveyance system. If an air hose connecting the injector to a control unit should be kinked, or if different lengths of such air hoses were to be used, or if one injector were replaced by another with a different flow impedance, the rate of conveyance air, the rate of any supplemental air and/or the total rate of air would therefore automatically change.

These fluctuations of the conveyance air rate will arise even when the computer memory stores plots for several different spray powder-coating systems because even in such a case inevitably air hoses shall be kinked or exchanged in the course of daily operations, and/or injectors shall be exchanged for others exhibiting different flow impedances.

On the other hand, to attain good efficiency in spray powder coating and a functionally as well as sightly satisfactory powder coating surface, the powder must be conveyed at specific, constant flow. If the flow is too low, there will be danger of powder deposits in the powder hose. If the conveyance rate is too high, the powder particles will recoil from the object being coated. Appropriate powder conveyance speeds are in the approximate range of 10 m/s to 20 m/s. However, to keep the powder flow at a given desired value, or within a range of desired values, the corresponding air flow conveying the powder must be kept correspondingly constant.

Air dividers are known from U.S. Pat. No. 3,625,404 and German patent 44 09 493 that comprise a throttling valve in a pneumatic conveyance line and a throttling valve in an supplemental pneumatic line. The two throttling valves are mechanically interlinked. To the extent one of them is opened, the other shall be closed. Throttling valves offer the advantage over pressure regulators that, in relation to their adjusted cross-sectional aperture and hence their adjusted flow impedance, whey will not keep pressure constant but instead will keep constant the airflow through them. A simple control unit is enough to adjust the throttles. A control circuit measuring the actual values is not required. Accordingly throttle valves may be construed being volumetric valves. The "volumetric flow"—herein denoting "volume per unit time"—is substantially independent of changes in the flow impedance in the flow path downstream of the flow throttle as long as said impedance remains relative small with respect to the flow valve's impedance. However as regards spray powder coating systems the flow impedances in the injector and in the powder hose connecting the injector to the system already are large enough to present a drawback of flow throttles: This drawback is that the adjusting motion of the throttle does not entail a proportional or linear adjustment of the volumetric air flow through the throttle aperture. As a result, when using the known tandem throttles, only the theoretical total air "flow",—herein "flow" denoting "quantity per unit time—namely air conveyance flow plus supplemental air flow, will be set but not attained in practice. In order to attain accurate values, curved surfaces for the walls of the throttle aperture would have to be empirically determined in complex and time-consuming manner to attain linearity between adjusting the throttle cross-section and the resultant changes air conveyance flows. Such shapes of the throttling aperture cross-section would have to be determined for each variation of the spray powder coating systems exhibiting different flow impedances and each variation in turn would entail using correspondingly designed throttles.

The objective of the invention is to create an accurately operating but economical system not resorting to a complex and costly system of the kind disclosed in the European patent document 0 636 420 A and furthermore free of the throttling inaccuracies of the systems described in U.S. Pat. No. 3,625,404 and German patent 44 09 493.

This problem is solved by the features of claim 1.

In the invention, the throttling valves are inter-linked not mechanically but by a calculating mechanism and in particular by an electronic computer. This computer stores in a most simple manner the typical empirical values of at least one embodiment of a spray coating system. The representative values of a plurality of such systems can be stored in a computer or the like or computer and can be easily retrieved in programmed manner for application to the coating operation.

The invention is elucidated below by means of an illustrative and preferred embodiment in relation to the drawings.

Figure 2:
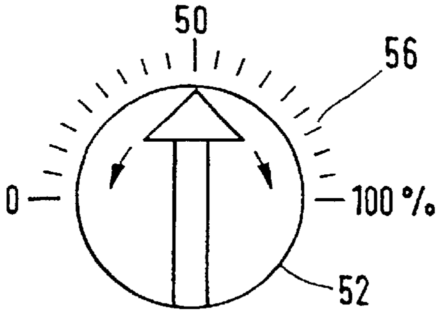
Figure 3:
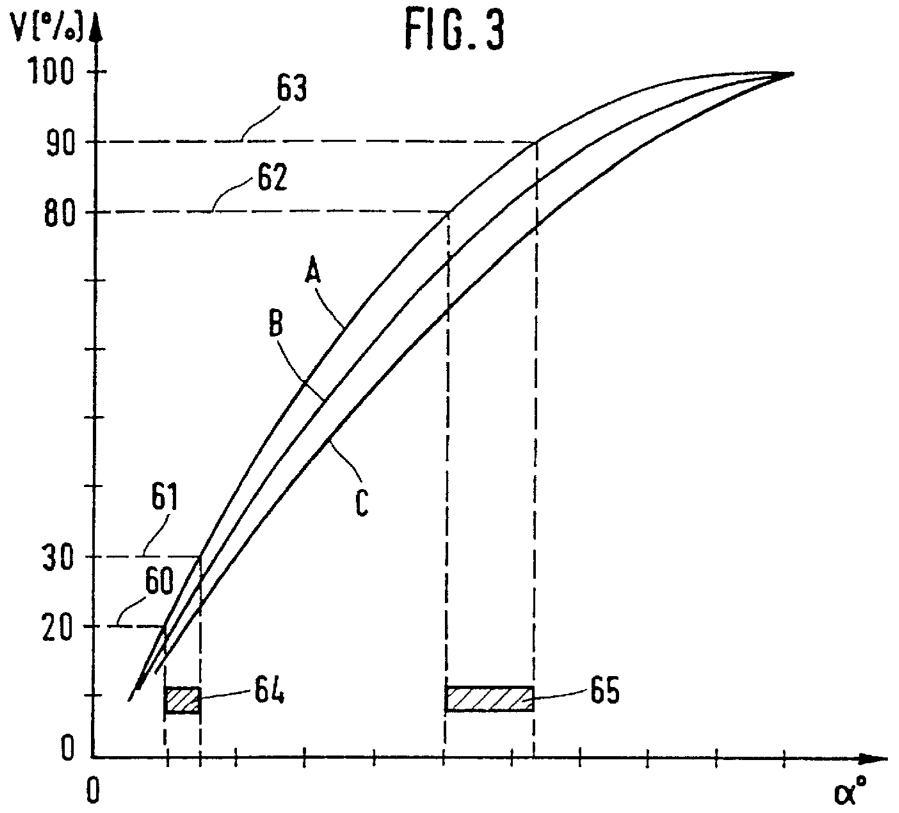
Figure 4:
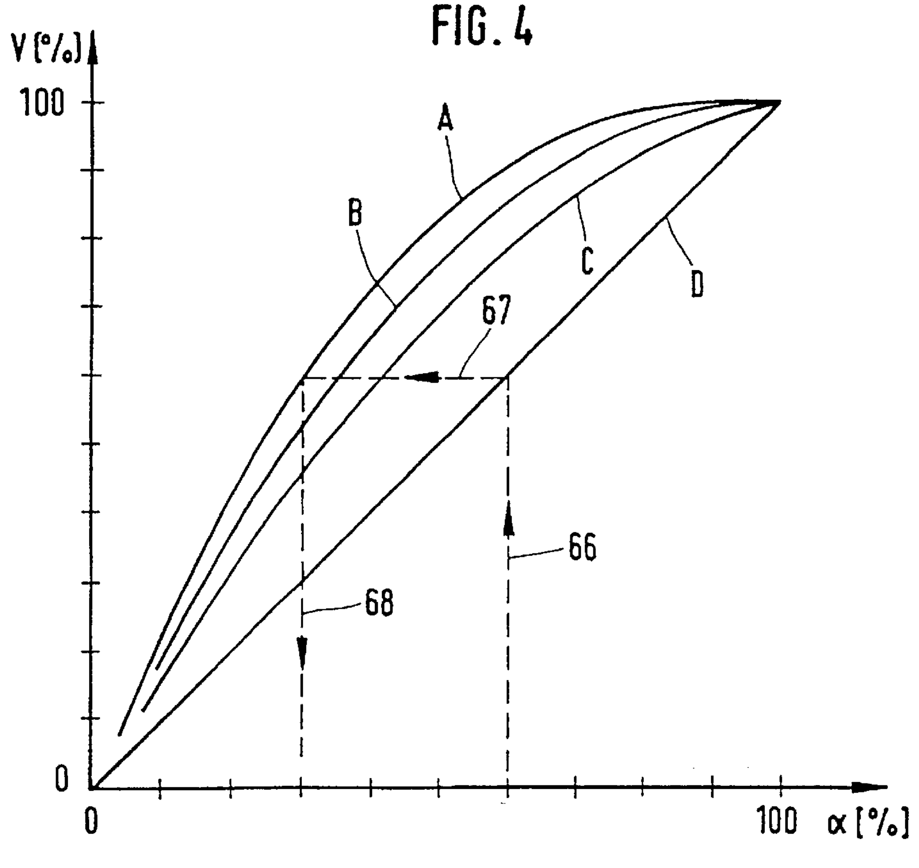

FIG. 1 schematically shows a spray powder coating system of the invention,

FIG. 2 is a detail of the spray powder coating system of FIG. 1,

FIG. 3 is a plot of a throttle designed with adjustable aperture and situated in a compressed-air line, the range of adjustment of the throttle—stated as the angle of rotation a—being the abscissa and the volumetric rate of compressed-air flow from 0 to 100% (maximum quantity for constant intake air pressure) being the ordinate, abscissa and ordinate being on a linear scale, several—for instance three—curves A, B and C being shown representing the required throttle setpoint a for a desired volumetric flow of compressed air, each curve A, B and C corresponding to the empirically determined flow impedance of another design of a flow path adjoining the throttle downstream of it, and FIG. 4 being a plot wherein the setpoint range of the angle of rotation of the throttle shown as 0 to 100% of the angles a is the linear abscissa, this linear setpoint range of the abscissa corresponding to a manual setpoint input element or to linear electrical setpoint values of an electrical setpoint drive, and showing the ordinate as the volumetric rates in the form of a percent range from 0 to 100%, and showing the three curves A, B and C of the three flow paths each of which exhibits another flow impedance, furthermore a straight line, whereby a computer or the like can "move" vertically upward from a setpoint value on the abscissa to the straight line and then horizontally to the pertinent curve A, B or C and then return vertically down to the abscissa where it shall find the percentage of the angle α at which the throttle shall be set in order that a rate of volumetric compressed air (V) shall be attained on the ordinate where the vertical projected line of the reference value crosses the straight line.

FIG. 1 shows in axial cross-section an injector 2 as the pneumatic powder conveying pump. A pneumatic conveying line 4 is fitted with a throttle 8 set by an adjusting motor 6 and is connected to an injector nozzle 10. An air/powder duct 12 is mounted axially opposite the injector nozzle 10. On its path from the injector nozzle 10 to the air/powder duct 12 and in a zone 14, the conveyance air produces a partial vacuum which aspirates powder 15 out of a powder container 16 through a suction tube 18 into the conveying air. The conveying air moves the powder through the air/powder duct 12, through a powder hose 20 and then through a manual automatic spray gun 22 onto an object 24 being coated. In known manner, the spray gun 22 may be fitted with one or more high-voltage electrodes 26 to electrostatically charge the coating powder. In another embodiment of the invention, the powder hose 20 issues into a further powder container 30 and if called for it may be replaced by a rigid tube.

An supplemental air line 32 also contains a throttle 34 of which the cross-sectional aperture is set by another adjusting motor 36. At a site downstream of the injector nozzle 10, the compressed air of the supplemental air line 32 enters the air/powder duct 12. In an omitted embodiment, the supplemental air line 32 also may issue into the zone of partial vacuum 14.

The rate of powder moved by the injector 2 is approximately directly proportional to the quantity of air conveyed per unit time and also approximately proportional to the magnitude of the partial vacuum in the partial vacuum zone 14. The less the rate of powder to be conveyed, the smaller the rate of conveyance air. As regard small rates of powder and corresponding small rate of conveying air, supplemental air from the supplemental air line 32 must be added in order that no powder shall deposit in the hose 20. The total rate of air consisting of conveying and supplemental air preferably shall be constant and of such a magnitude as regards the known spray powder coating systems that the speed of the air in the powder hose 20 shall be in the range of 10–15 m/s. Accordingly it is important to keep constant the total air rate.

The downstream ends of the pneumatic conveying line 4 and of the addition air line 32 are connected to a compressed-air feed line 40 which is supplied with compressed air from a source of compressed air 44, for instance a commercial compressed-air network, through a pressure regulator 42. An adjustable throttle 46 may be mounted inside the compressed-air feed line downstream of the pressure regulator 42 and be adjusted in such manner by an adjusting motor 48 that the rate of total air shall be kept constant.

The adjusting motors 6, 36 and 48 are controlled as a function of reference values by a control unit 50 connected to said motors Instantaneous values of the various compressed air flows need not be measured nor be taken into account to set the throttles 6, 36 and 48 because these throttles can be set accurately in the manner described below without requiring a regulator with instantaneous-value feedback to attain the desired compressed-air volumetric flows.

The electric control unit 50 contains at least one computer or the like. It also contains a manual adjustment means 52 for setpoint values. The adjustment means 52 comprises a manual setpoint element 54 in the form of a key, a slide or a rotary knob, a rotary knob being assumed in the present case. The manual setpoint element 54 can be adjusted on a linearly graduated scale 56 over an angle of rotation for instance of 180°. These 180° appear as a linear graduation on the abscissa of FIG. 3 as a range of 0 to 100%.

The notation of the scale 56 may be in angular degrees or percentages or volumetric flows of compressed air or rates of powder or their percentages.

A setpoint of the total conveyed air rate consisting of conveying air of the pneumatic conveyance line 4 and of the supplemental air of the supplemental air line 32 is stored in the electric control unit 50. Only one setpoint of the conveyed volumetric air rate of the pneumatic conveyance line 4 needs being fed to the setpoint adjusting means 52 in order to control the throttle 34 of the supplemental air line 32. Thereupon the control unit 50 calculates the differential of the total air setpoint and the conveying air setpoint and uses this differential to adjust the supplemental air throttle 34.

The control unit 50 may be used in this embodiment of three throttles 8, 34 and 46, and further in embodiments with only one or two of said throttles. Each of said throttle can be driven by the control unit 50 according to the plot of FIG. 3 or that of FIG. 4 without requiring measurement or measurement feedback for regulation. The control of the conveying air throttle 8 is described below in representative manner.

In one embodiment of the present invention, a plot as shown in FIG. 3 is stored for each throttle 8, 34 and 46 in the control unit 50 of FIG. 1. The setpoint angles of rotation of the particular throttle 8 or 34 or 46 are recorded on the abscissa. The percentages from zero to 100% of the compressed-air rates which can be conveyed through the throttle at a given, constant intake air pressure are linearly recorded on the ordinate. Illustratively as regards the plot of FIG. 3, the volume percentages 20, 30, 80 and 90 of the ordinate of curve A correspond to the projected lines 60, 61, 62 and 63 from which are obtained the corresponding setpoint angles a of the pertinent throttle 8, 34 or 46. The kind and magnitude of the curvature of curve A depends on the flow impedance of the flow path adjoining the pertinent throttle 8 or 34 or 46 on is downstream side. In other words, each flow path downstream of the particular throttle 8, 34 or 46 exhibits a different impedance for which a corresponding curve must be stored in the control unit 50. Two further illustrative embodiments are shown by the other two curves B and C in FIG. 3.

In order to adjust the conveyance air of the pneumatic conveyance line 4 by means of the throttle 8, the setpoint adjusting means 52 contains a linear graduation either in percentage again or linear on a given scale of the particular rate of conveying air. These values being directly proportional to the rate of conveyed powder, the percentages also may be viewed as a corresponding rate of powder, in other words the scale may be given in terms of powder conveyance rates.

The control unit 50 calculates the setpoint for the throttle 34 of the supplemental airline 32 by taking the differential of the rate of total conveyance air and the rate of the conveyance air. As regards the plot of the supplemental air throttle 34 corresponding to FIG. 3, again curved lines similar to the curves A, B and C are used of which the curvatures depend on the flowpath's impedance downstream of the supplemental air throttle 34. Because the supplemental air much less affects coating quality than the conveyance air, said supplemental air of the supplemental air line 32 might be regulated by a pressure regulator instead of the throttle 34, though this option would be costly. Again as regards the feed line 40 of which the throttle 46 might be controlled in the same manner according to a plot of FIG. 3, such a throttle 46 might be eliminated because the control unit 50 is able to calculate from the sum of conveyance and supplemental air the total rate of air and thereby shall be able to use the throttles 8 and 34 of the air conveyance line 4 and supplemental air line 32 to keep the total air rate constant.

As shown by the projected lines 60, 61, 62 and 63 in FIG. 3, the throttle-setpoint change-values α are not proportional to the changes in the compressed air rates. Illustratively a 10% change in compressed-air rate taking place in the range of 20 to 30% is caused by a much smaller change of the throttle's setpoint angle a than in the upper percentage range for instance between 80 and 90% as indicated by the shaded zones 64 and 65.

The further embodiment of the invention shown in the plot of FIG. 4 shows a straight line D in addition to the curved lines A, B and C and this line D, just as the characteristic lines A, B and C had to be determined empirically and is stored in the hardware/software inside the control unit 50. Practically the straight line D shows a "linearisation" of the non-linear relation between the air flow and the throttle setpoint. The adjustment range of the manual setpoint element 54 is shown on the abscissa in linearly graduated manner from 0 to 100% of the setpoint angles α. This graduation also applies to the setpoint range of the pertinent throttle. If electrical setpoints from a higher-rank control unit are used instead of a manual setpoint element 54, there shall be equal graduations of the abscissa for instance for timing signals or other electrical current and/or voltage shapes. If using electrical stepping motors as the adjusting motors 6 or 36 or 48, timing pulses shall be appropriately used. These electric variations also are applicable to a plot of FIG. 3. The ordinate of FIG. 4 shows the flow for the particular kind of air from 0 to 100% or in actual units. In this discussion the plot of FIG. 4 is illustrative of the conveyance-air throttle 8, however similar plots also are stored in the control unit 50 for any supplemental-air throttle 34 and any feed-air throttle 46. The reference values indicated on the abscissa are obtained in the same manner as described above.

As shown by the dashed, projected lines 66, 67 and 68 relating to the curve A in FIG. 4, a linear value may be adjusted manually or electrically at the setpoint adjusting means 52, said linear value being proportional to a value on the ordinate. Based on said value on the abscissa, the control unit 50 follows the projected line 66 vertically upward to the straight line D and then along the projected line 67 horizontally to the curve A and then along the projected line 68 again vertically down and back to the abscissa at the value indicated thereon, which is the value at which the throttle 8 must be adjusted by the control unit 50 and by the stepping motor 6 in order that a conveyance flow be attained which corresponds to that set at the setpoint adjusting means 52.

What is claimed is:

1. A spray powder-coating system comprising an injector (2) as a pneumatic feed pump, at least one compressed-air line to supply compressed air to the injector, a throttle (8, 34, 46) in at least one of the at least one compressed-air lines, an electronic control unit (50) fitted with a computer to adjust the cross-sectional aperture of the throttle (8, 32, 46) as a function of predetermined data, characterized in that the dependence of the adjustment of the throttle aperture on setpoints for the flow of air controlled by this throttle is stored as a plot in the control unit (50) for at least the flow impedance of one design of a flow path adjoining the throttle on its downstream side and in that the control unit (50) controls an adjusting motor (6, 36, 38) driving the throttle (8, 34, 46) as a function of said plot and that when there are changes in the set reference value said control unit implements a proportional change of the flow of compressed air, in that the flows of compressed air are plotted in the control unit (50) on one coordinate axis and the associated, required setpoint adjustment values of a setpoint adjusting means (52) are plotted on another coordinate of the plot and in that for each design of the flow path adjoining the throttle (8, 34, 46) at its downstream side a specific, curved characteristic line is stored in the plot in the control unit which, by means of each stored setpoint of the flow of compressed air will adjust in non-linear manner the throttle (8, 34, 46) by its adjusting motor (6, 36, 48) and thereby will generate an actual value of flow proportionately dependent on the adjusted setpoint.

2. Spray powder-coating system as claimed in claim 1, characterized in that the plot in the control unit (50) stores the values of said dependences for at least two designs of a flow path adjoining the throttle at its downstream side, each path being of a different flow impedance.

3. Spray powder-coating system as claimed in one of claims 1 through 2, characterized in that the minimum of one compressed air line (4) containing the throttle (8) is connected to an injector nozzle (10) of the injector (2) and in that the throttle (8) is configured in such manner that only that compressed air can pass through it as so-called conveyance air which is being fed through the injector nozzle (10).

4. Spray powder-coating system as claimed in claim 3, characterized in that a compressed-air line (32) other than the supplemental air line is connected to an air/powder duct (12) of the injector (2) running downstream from the injector nozzle (10, in that this supplemental air line (32) comprises a throttle (34), in that at least one total-air setpoint value for the sum of conveyance air (8) and supplemental air (32) is stored or is storable in the control unit (50), and in that the control unit (50) comprises means forming the differential of total air reference value and conveyance air reference value and on the basis of this differential as the reference value for the supplemental air will adjust the supplemental air at the throttle (34) of the supplemental air line (32).

5. Spray powder-coating system as claimed in claim 4, characterized in that empirically determined values of flows of supplemental air and the associated required setpoint values for the throttle (34) are stored in the control unit (50) for at least one design of the flow path exhibiting a given flow impedance and adjoining the throttle (34) of the supplemental air line (32), and in that the throttle (34) can be adjusted by the control unit (50) at that value of which the associated supplemental air flow value corresponds to said differential, where said differential is the reference value for the flow of supplemental air.

6. Spray powder-coating system as claimed in claim 4, characterized in that the control unit (50) comprises a setpoint generator input (52) receiving conveyance air setpoint values.

7. Spray powder-coating system as claimed in claim 6, characterized in that the setpoint generator input comprises a manual setting element.

8. Spray coating-powder system as claimed in claim 7, characterized in that the setpoint at the setpoint generator input (52) can be applied in the form of electric signals.

9. Spray powder-coating system as claimed in claim 1, characterized in that the minimum of one compressed-air line (4) containing the throttle (34) is connected to an air/powder duct (12) of the injector (2) which runs downstream from the injector nozzle (10) and in that the throttle (34) is configured in such a way that only that compressed air can pass through it as so-called supplemental air which is being fed into the air/powder duct (12) without passing through the injector nozzle (10).

10. A spray powder-coating system comprising an injector (2) as the pneumatic feed pump, at least one compressed-air line to feed compressed air to the injector, a throttle (8, 34, 46) in at least the at least one compressed-air line, an electronic control unit (50) fitted with a computer to adjust the cross-sectional aperture of the throttle (8, 34, 46) as a function of predetermined data, characterized in that the dependence of throttle-aperture adjustment on setpoints for the flow of compressed air controlled by this throttle is stored in the control unit (50) for at least the flow impedance of one design of the flow path adjoining the throttle at its downstream side and in that the control unit (50) controls an adjusting motor (6, 36, 48) driving the throttle (8, 34, 46) as a function of said plot and thereby implements a change of the flow of compressed air which is proportional to the changes in the setpoints, in that the flows of compressed air are plotted linearly on one coordinate axis in said plot and the cross-sectional apertures are plotted linearly on the other coordinate axis, in that for at least one design of a flow path adjoining the throttle (8, 34, 46) at its downstream side a curved characteristic line (A, B, C) is entered in the plot and represents the actual dependence of the flow of compressed air on the cross-sectional throttle aperture, the curved characteristic line providing the information of the setpoint of the cross-sectional throttle aperture required for each flow of compressed air, in that a straight characteristic line (D) is entered in the plot and corresponds to a theoretical linear dependences, not given in practice, of the flow of compressed air on the setpoints of the cross-sectional throttle aperture, in that the control unit (50) comprises a setpoint input (52) to receive linearly variable setpoints and is designed to pick out on the coordinate axis a cross-sectional aperture corresponding to the setpoint and to reflect it back through the straight characteristic line (D) and the curved characteristic line (A, B, C) onto the coordinate axis of the throttle cross-sectional aperture and then to adjust the throttle's cross-sectional aperture by driving the adjusting motor (6, 36, 48) in accordance with the newly ascertained cross-sectional throttle aperture.

* * * * *